United States Patent [19]
Culp et al.

[11] 3,818,790
[45] June 25, 1974

[54] CARPET TILE CUTTER

[75] Inventors: Charles R. Culp; Jacob A. Otthofer, Jr., both of Lancaster, Pa.

[73] Assignee: Armstrong Cork Company, Lancaster, Pa.

[22] Filed: Nov. 29, 1972

[21] Appl. No.: 310,386

[52] U.S. Cl. ............... 83/408, 83/417, 83/435.1, 83/648
[51] Int. Cl. ............................................ B26d 7/06
[58] Field of Search ............ 83/431, 433, 408, 422, 83/423, 648, 658, 417, 435.1

[56] References Cited
UNITED STATES PATENTS
2,161,346   6/1939   Goldstein ............................. 83/422
FOREIGN PATENTS OR APPLICATIONS
583,246   7/1959   Canada ................................. 83/408

*Primary Examiner*—Andrew R. Juhasz
*Assistant Examiner*—W. R. Briggs

[57] ABSTRACT

An apparatus is provided for making carpet tiles. Large pieces of carpeting material are fed through a series of carpet cutters to form one-square-foot carpet tiles. A large piece of carpeting or a carpet slug is automatically fed onto a conveyor structure and passed by several carpet cutters which cut the carpet slug into a plurality of one-square-foot carpet tiles. Carpet is conveyed on a needle bed support structure with the carpet face against the needles of the needle bed so that the carpet cutters will cut on the back surface of the carpet.

2 Claims, 3 Drawing Figures

PATENTED JUN 25 1974 3,818,790
SHEET 2 OF 2
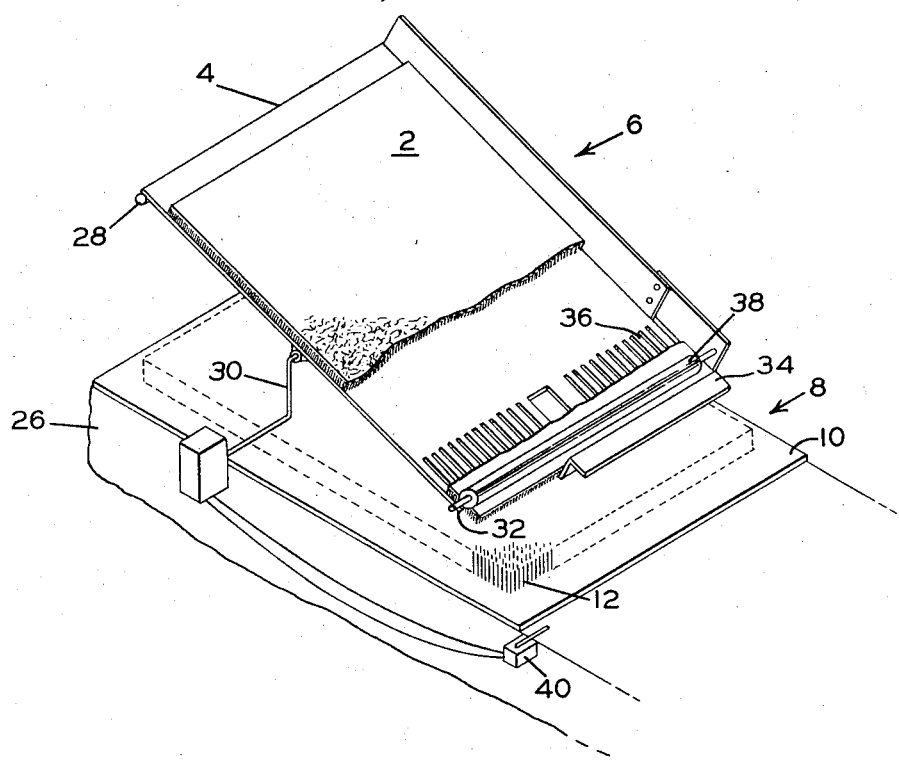
Fig. II
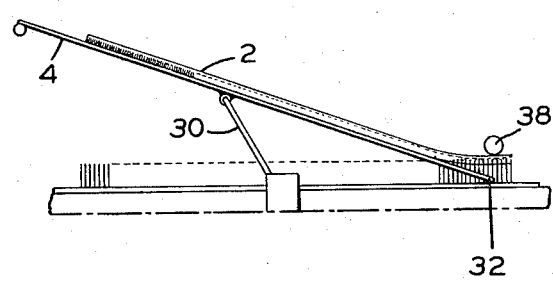
Fig. III

CARPET TILE CUTTER

BACKGROUND OF THE INVENTION

1. Field of the Invention

The invention herein is directed to a cutting apparatus and, more particularly, to an apparatus for cutting carpet tiles.

2. Description of the Prior Art

Carpet tiles were usually cut from the carpet by cutting from the top side of the carpet so that the cutting means pass first through the pile and then through the backing of the carpet. Since the pile usually leans in one direction, the cutting of the carpet from the top thereof would sever some of the pile which leaned over the area being cut. When the tile was laid thereafter the edge which had the leaning pile would show a gap at that edge because some of the pile had been cut off.

One of the first attempts at correcting the situation was the use of the apparatus set forth in U.S. Pat. No. 3,621,743. In the patented structure therein, rotary cutters are arranged beneath the path of a carpet moving over end-to-end tables having coplanar tops. The first table has a series of transversely spaced rotary cutters or slitters arranged below the plane of the carpet. The cutters or slitters are so adjusted that the carpet moves longitudinally over the table and the rubber or similar backing is cut through precisely, and no cutting of the pile takes place. The advancing carpet then passes on to the second table where its movement is arrested and a carriage carrying longitudinally spaced transverse rotary slitters is moved transversely beneath the tables to slit through the backing only of the stationary carpet. The carpet having been previously longitudinally slit, the transverse slitters will cut the strips of carpet to form separate accurately square tiles. When the carriage for the transverse slitters reaches the opposite side of the table, its movement is arrested pending an additional longitudinal movement of a carpet to a position for the next transverse slitting operation, whereupon movement of the carpet is stopped and the carriage moves back beneath the table to the first side thereof to again transversely slit the carpet into tiles.

There is currently available on the market another carpet cutting structure wherein the carpet is carried on a pin conveyor and moved in a vertical plane. The carpet passes by seven vertical slitters which cut the continuous length of carpet into strips. A single horizontal cut-off knife then moves transversely of the carpet to cut the carpet strips into a plurality of individual carpet tiles.

U.S. Pat. No. 2,161,346 discloses it is old to use a needle board for supporting fur or carpet-like material so that it may be cut into a series of strips by rotating knives which cut through the back part of the fur while the front face of the fur is resting upon a needle board. This thus permits the hide portion of the fur to be cut without any damage to the hair portion of the fur.

SUMMARY OF THE INVENTION

The invention herein is directed to a total apparatus for automatically feeding carpet slugs through a cutting apparatus to convert the carpet slug into a plurality of carpet tiles. A carpet slug is normally a multi-square-foot piece of carpeting which is placed upon a feeder structure. The feeder automatically feeds the carpet slug down onto a needle board. The needle board then carries the carpet past a first series of rotary knives which cut the back surface of the carpet to separate the carpet slug into a plurality of strips of carpet. The carpet is left on the needle board, and the needle board is then moved in a direction 90° from its original path of movement so that the carpet slug is passed under a second set of rotary knives. The second set of rotary knives cuts the carpet slug with lines of cut which are at a 90° angle from the original lines of cut. This converts the carpet slug into a plurality of carpet tiles. The carpet tiles are removed from the needle board, and the needle board is returned to the carpet slug feeder structure so that another carpet slug may be placed upon the needle board so that it, in turn, may carry that carpet slug through the series of rotary cutters.

The invention herein is directed to a structure which avoids the intermittent operation of the prior art patent and techniques. The carpet is converted to slugs so that it may be easily handled and then is fed through a series of cutting structures without the need for the intermittent operation of the apparatus. The apparatus can actually be laid out in a turntable structure wherein four needle boards simply travel around a turntable structure and carry a plurality of carpet slugs past the rotary cutters to convert the carpet slugs into carpet tiles.

BRIEF DESCRIPTION OF THE DRAWING

FIG. I is a perspective view of the apparatus of the invention herein;

FIG. II is a perspective view of the carpet slug feeder; and

Figure 1:
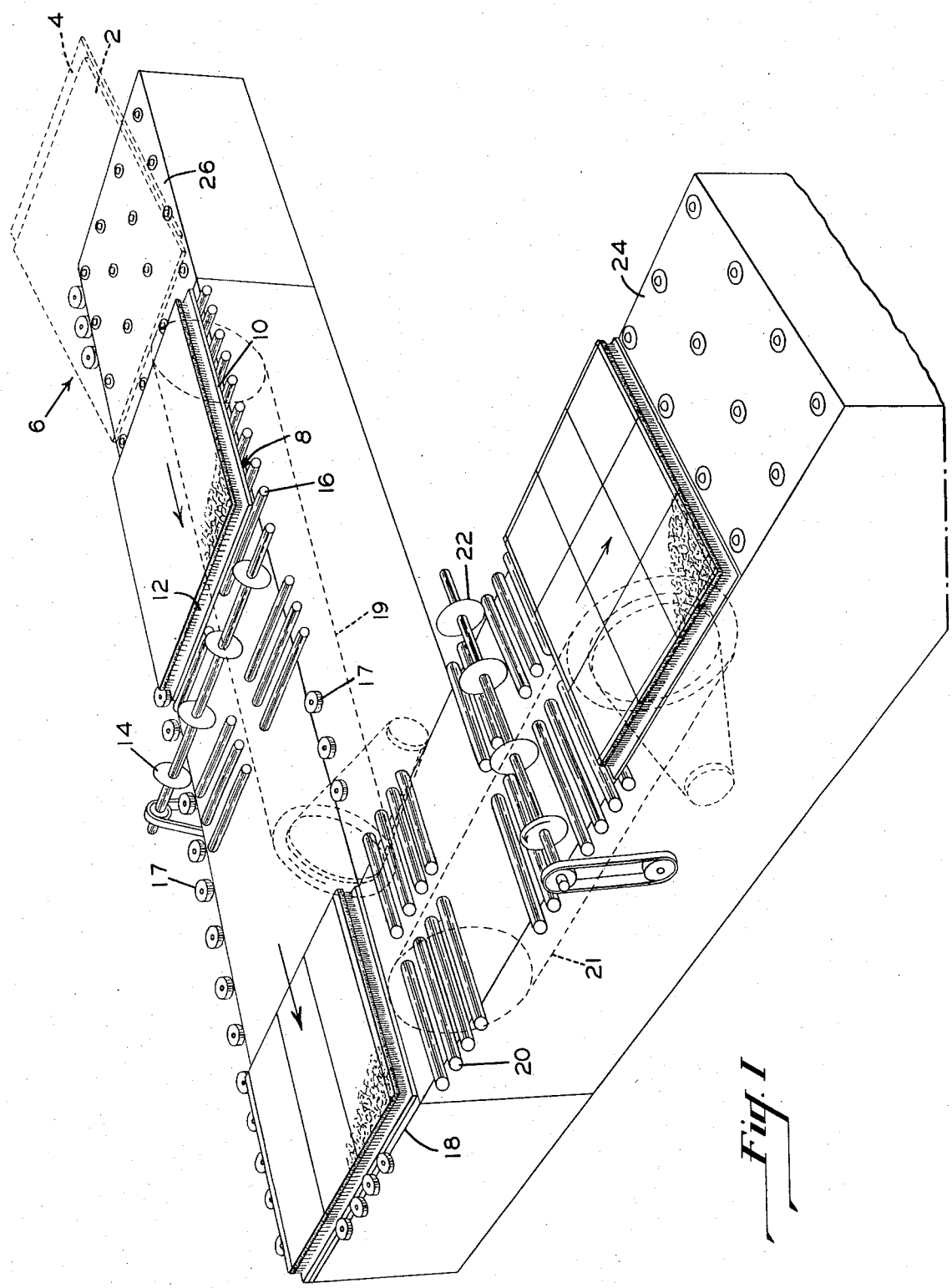

FIG. III is a side view of the carpet slug feeder herein.

DESCRIPTION OF THE PREFERRED EMBODIMENT

FIG. I is a perspective view of the overall apparatus for cutting a carpet slug into carpet tiles. A carpet slug could be almost any size. In the embodiment shown, the carpet slug 2 is 37 inches square and is placed on the chute 4 of the carpet slug feeder structure 6 with the carpet face downward. By means to be described later, the chute of the carpet slug feeder drops the carpet slug down onto the needle board conveyor 8 at the appropriate time to have the slug positioned on the needle board 8. The needle board 8 is composed of a base structure 10 and a plurality of needle structures 12 which are approximately 3 inches in length and are spaced about one-half inch apart on the board structure. Around the edge of the carpet slug and in those areas where the carpet slug will be cut, the density of the needles is increased to 4 needles per inch to provide maximum support at those points where the carpet is subjected to maximum stress during the cutting operation. Also, it is obvious, by the fact that the carpet is resting upon the needles, that the needles cannot only support the carpet in the horizontal plane, but they prevent the carpet from slipping within the horizontal plane. Consequently, the increase in the number of needles in those regions where the carpet is subject to stress will help increase the resistance of the carpet to moving within the horizontal plane of the carpet slug at those points o stress. of A plurality of rotating knives 14 are positioned above the roller conveyor structure 16 along which the carpet slug and needle board are moved. The rotating knives are very similar to those set forth in U.S. Pat. No. 3,621,743. The knives or rotary cutters are so positioned that they will cut through the backing of the carpet, but not an excessive distance into the face material of the carpet. Since the backing for the carpet is actually what is being supported on the needles of the needle board, the rotary blade cutter is positioned to cut just below the plane of the points of the needles. This will provide a cutting all the way through the backing of the carpet without a cutting into the fibers of the carpet facing. The rotary cutters 14 are spaced apart one foot with the two end cutters providing a trimming action on the edge of the carpet slug. The carpet slug then slides down to ball transfer conveyor 18. Naturally, the conveyor structure 16 is provided with guide structures 17, along the side thereof to prevent lateral displacement of the needle board, particularly as it moves under the rotary cutters. A drag chain 19 with a lug engages the trailing edge of the needle board and pushes the needle board down along conveyor 16. When the needle board reaches the ball conveyor 18, the lug of the drag chain slides out of engagement with the needle board and goes back through the return path of the chain to engage the next board in line. The ball transfer conveyor structure is nothing more than a plurality of ball bearings mounted in sockets on the planar surface of the conveyor structure. This simply means that the needle board may slide upon the ball transfer conveyor and then move rapidly off the transfer conveyor at a 90° angle onto the next roller conveyor structure 20.

The next conveyor structure 20 has a drag chain 21 and lug which engages the needle board and pushes the needle board under the second set of rotary knives 22. These knives then cut the carpet slug with cuts which are at a 90° angle to the original cuts placed on the carpet slug by the rotary knives 14. The spacing between the rotary knives 22 is such as to cut a plurality of 1-foot-square tiles from the carpet slug which had previously been cut into 1-foot-wide strips by the rotary cutters 14. The needle board then rides on down to another ball transfer conveyor 24. At this point, the carpet tiles are removed from the needle board, and the needle is returned by appropriate conveyor structures back to its starting point, which is a third ball transfer conveyor 26. Mounted above the ball transfer conveyor 26 is the carpet slug feeder 6.

FIGS. II and III show the carpet slug feeder structure in detail. This structure is basically composed of a chute 4 which is pivotally mounted at point 28 above the conveyor 26. A stop structure 30 is positioned to hold the end 32 of the chute above the needle board 8. A carpet slug 2 is placed upon the inclined chute 4 and is held on the chute by a stop 34 which holds the leading edge of the carpet slug roughly even with the edge 32 of the chute.

The chute is provided with a plurality of finger-like structures 36. The spacing between the fingers is positioned to match up with the positioning of the needles 12 on the needle board so that, when the leading edge 32 of the chute is permitted to drop, the fingers 36 can drop between the needles on the needle board, and the needles can protrude up between the spaces between the fingers to quickly engage the leading edge of the carpet slug 2. A roller 38 is positioned on the front edge of the slide 4 and is raised above the finger structure approximately the thickness of the carpet slug. Consequently, when the leading edge of the chute 32 drops down between the needles of the needle board, the roller 38 will be pushing the carpet down against the needles of the needle board. The needle board then actually pulls the carpet slug 2 off the chute 4. The dropping of the front edge 32 of the chute is controlled by the stop 30.

The arm 30 is rotatable between roughly an upright position, as shown in FIG. II, and an inclined position, such as shown in FIG. III. The rotation is carried out through the use of an air cylinder and air line which are controlled by a switch 40. The switch is contacted by the leading edge of the needle board as it starts down the conveyor 16. The switch 40 will move the arm 30 to permit the chute 4 to drop into position so that the carpet is engaged on the needle board and stripped from the chute by the needle board. After the needle board has passed beyond the switch 40, the switch 40 will cause the arm 30 to return to its upward position so that the leading edge of the chute is now raised. Another carpet slug may be placed upon the chute 4 and will be held in place by the stop 34 until such time as the chute is permitted to drop down again upon the next needle board structure.

The above structure now permits the automatic placing of a carpet slug in its proper position upon a needle board structure. A conveyor structure then carries the needle board past a first series of rotary cutters which will now cut the carpet slug into a plurality of strips. At the end of the first conveyor structure, the needle board moves to a transfer conveyor, which now permits the needle board to move in a direction at a 90° angle from its original direction of movement. A third conveyor carries the needle board under a second set of rotary cutters which now cut the carpet slug with cut lines at a 90° angle to the first set of cut lines. This converts the carpet slug into a plurality of carpet tiles. The carpet tiles can then be removed from the needle board and the neeldle board returned to its starting position so that another carpet slug may be automatically fed down onto the needle board.

The above described structure sets forth a technique for cutting shag or cut pile carpet wherein the carpet face is placed against the needle board structure. The idea here is to cut only the carpet backing and not the fiber of the carpet face. When a looped pile or needle-bonded carpet is to be cut, the face loops or fibers must be cut. Therefore, the carpet slug is placed on the needle board structure with the back of the carpet on the needles and the carpet face toward the cutters.

What is claimed is:

1. An apparatus for forming carpet tiles wherein a feed structure automatically positions a carpet slug of a multi-square-foot dimension upon a needle board conveyor structure, said automatic feeding structure is an inclined chute structure which moves from a raised position to a lowered position to permit the carpet slug to slide off the chute structure onto the needle board conveyor structure, said needle board conveyor structure being a base structure with a plurality of upright needles positioned thereon, said needle board conveyor structure moving the carpet slug below a plurality of cutting means which cut the carpet slug on the needle board conveyor structure into a plurality of strips, the cutting edge of the cutting means is so positioned relative to the plane of the points of the needles on the needle board conveyor structure that the cutting means cuts below the plane of the needles of the needle board conveyor structure, conveying the same needle board conveyor structure in the direction at an angle of 90° from its first direction of travel under a second set of cutting means which now cut the carpet slug with a series of cut lines at a 90° angle relative to the original cut lines on the carpet slug whereby there is formed a plurality of carpet tiles.

2. The apparatus of claim 1 wherein the chute structure is moved from its raised to its lower position by a mechanical means which is responsive to the movement of the needle board conveyor structure past a control means so that the chute means is lowered to its lower position only when the needle board conveyor structure is in its proper position to receive the carpet slug.

* * * * *